(12) United States Patent
Hallivuori

(10) Patent No.: US 9,825,655 B2
(45) Date of Patent: Nov. 21, 2017

(54) METHOD AND APPARATUS FOR AN ANTENNA

(71) Applicant: Nokia Technologies Oy, Espoo (FI)

(72) Inventor: Juha Hallivuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/900,953

(22) PCT Filed: Jun. 28, 2013

(86) PCT No.: PCT/FI2013/050720
§ 371 (c)(1),
(2) Date: Dec. 22, 2015

(87) PCT Pub. No.: WO2014/207292
PCT Pub. Date: Dec. 31, 2014

(65) Prior Publication Data
US 2016/0173140 A1    Jun. 16, 2016

(51) Int. Cl.
*H04B 1/46* (2006.01)
*H04B 1/04* (2006.01)
(Continued)

(52) U.S. Cl.
CPC ........... *H04B 1/0458* (2013.01); *H01Q 1/243* (2013.01); *H01Q 1/525* (2013.01); *H01Q 5/335* (2015.01); *H01Q 5/35* (2015.01)

(58) Field of Classification Search
USPC ..... 455/13.3, 19, 25, 63.4, 82, 562.1, 575.7, 455/107, 121–123, 129, 101
See application file for complete search history.

(56) References Cited

U.S. PATENT DOCUMENTS 3,172,111 A * 3/1965 Breetz ............... H01Q 9/26
342/368
5,021,800 A * 6/1991 Rilling ............... H01Q 9/16
342/372

(Continued)

FOREIGN PATENT DOCUMENTS

EP         1437795       7/2004
JP       2001053544      2/2001
(Continued)

OTHER PUBLICATIONS

International Search Report and Written Opinion received for corresponding Patent Cooperation Treaty Application No. PCT/FI2013/050720, dated Mar. 5, 2014, 16 pages.
(Continued)

*Primary Examiner* — Edward Urban
*Assistant Examiner* — Rui Hu
(74) *Attorney, Agent, or Firm* — Mintz Levin Cohn Ferris Glovsky and Popeo, P.C.

(57) ABSTRACT

There are disclosed various methods and apparatuses for an antenna. In some embodiments of the method a transmission signal is provided to a first feed point (126) of an antenna (102). A modified signal is generated from the transmission signal and provided to a second feed point (128) of the antenna (102). In some embodiments the apparatus comprises an antenna comprising a first feed point (126) and a second feed point (128). There is also a first interface to provide a transmission signal to the first feed point (126), and a phase shifter (124) for generating a modified signal from the transmission signal. The modified signal is provided to a second feed point (128) of the antenna (102).

18 Claims, 6 Drawing Sheets

(51) Int. Cl.
*H01Q 5/335* (2015.01)
*H01Q 5/35* (2015.01)
*H01Q 1/24* (2006.01)
*H01Q 1/52* (2006.01)

(56) References Cited

U.S. PATENT DOCUMENTS

| | | | | |
|---|---|---|---|---|
| 5,206,656 | A * | 4/1993 | Hannan | H01Q 1/283 343/705 |
| 5,343,173 | A * | 8/1994 | Balodis | H01Q 11/08 333/126 |
| 5,867,127 | A * | 2/1999 | Black | H01Q 1/244 343/702 |
| 6,362,792 | B1 * | 3/2002 | Sawamura | H01Q 1/244 343/702 |
| 6,369,771 | B1 * | 4/2002 | Chiang | H01Q 1/242 343/700 MS |
| 6,940,466 | B2 * | 9/2005 | Terry | G06K 19/0723 343/841 |
| 7,469,131 | B2 | 12/2008 | Nail et al. | |
| 7,912,499 | B2 | 3/2011 | Ouzillou | |
| 2005/0052283 | A1 * | 3/2005 | Collins | G06K 19/07767 340/572.7 |
| 2007/0024514 | A1 * | 2/2007 | Phillips | H01Q 9/42 343/744 |
| 2007/0085754 | A1 | 4/2007 | Ella et al. | |
| 2009/0058758 | A1 * | 3/2009 | Nishio | H01Q 1/2266 343/893 |
| 2009/0213020 | A1 * | 8/2009 | Rentz | H01Q 5/00 343/722 |
| 2011/0021139 | A1 * | 1/2011 | Montgomery | H04B 5/0081 455/41.1 |
| 2011/0028103 | A1 * | 2/2011 | Rofougaran | H01Q 1/2258 455/77 |
| 2011/0038429 | A1 * | 2/2011 | Sako | H01Q 1/242 375/259 |
| 2011/0207422 | A1 * | 8/2011 | Ban | H01Q 1/48 455/128 |
| 2012/0019420 | A1 | 1/2012 | Caimi et al. | |
| 2012/0220243 | A1 * | 8/2012 | Mendolia | H04B 1/0458 455/77 |
| 2013/0064149 | A1 | 3/2013 | Huang | |
| 2013/0122831 | A1 | 5/2013 | Desclos et al. | |
| 2013/0157592 | A1 * | 6/2013 | Montgomery | H04B 5/0081 455/78 |
| 2013/0321093 | A1 * | 12/2013 | Ueda | H01P 1/32 333/17.3 |
| 2014/0206298 | A1 * | 7/2014 | Montgomery | H04B 5/0081 455/77 |
| 2014/0269449 | A1 * | 9/2014 | Abramsky | H04L 5/14 370/278 |
| 2015/0130669 | A1 * | 5/2015 | Sonoda | H01Q 7/00 343/702 |
| 2015/0280323 | A1 * | 10/2015 | Liu | H01Q 1/243 343/745 |

FOREIGN PATENT DOCUMENTS

| | | |
|---|---|---|
| WO | 0131737 | 5/2001 |
| WO | 2008/066344 A1 | 6/2008 |
| WO | 2008131157 | 10/2008 |
| WO | 2012153282 | 11/2012 |
| WO | 2013/020969 A1 | 2/2013 |
| WO | 2014/114843 A1 | 7/2014 |

OTHER PUBLICATIONS

Ranta et al., "Antenna Tuning Approach Aids Cellular Handsets", Microwaves and RF, Nov. 12, 2008, pp. 82-92.

Eero et al., "Small Size Receiver Band Self-Interference Cancellation Amplifier for 4G Transceivers", Proceedings of the 7th European Microwave Integrated Circuits Conference, Oct. 29-30, 2012, pp. 663-666.

International Search Report and Written Opinion received for corresponding Patent Cooperation Treaty Application No. PCT/FI2013/050719, dated Feb. 5, 2014, 16 pages.

Mammano, Robert. "Switching Power Supply Topology Voltage Mode vs." *Current Mode, Unitrode Design Note* (1994).

* cited by examiner

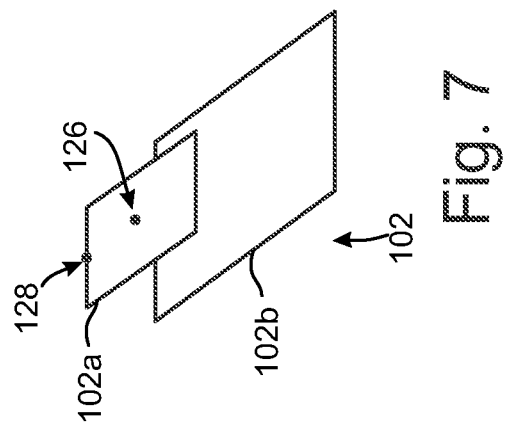
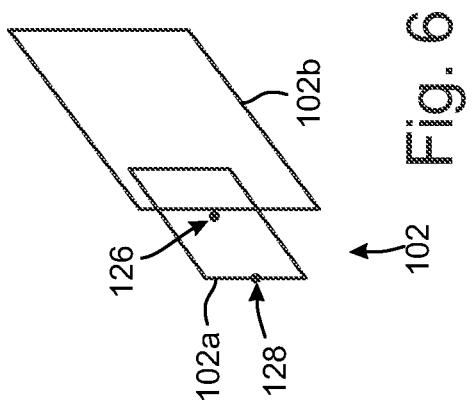

METHOD AND APPARATUS FOR AN ANTENNA

RELATED APPLICATION

This application was originally filed as PCT Application No. PCT/FI2013/050720 filed Jun. 28, 2013.

TECHNICAL FIELD

The present invention relates to a method for an antenna and apparatus comprising an antenna.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In some apparatuses which are able to transmit signals by a transmitter and receive signals by a receiver may suffer transmitter initiated problems due to e.g. interference caused by the transmitted signal. For example in frequency division duplexing (FDD) systems both the transmitter and receiver may be operating simultaneously. The transmission may generate wideband noise and other potential spurs at a relatively high power level compared to received signals, wherein signals generated by the transmitter on a transmission (TX) band may induce interference and/or other disturbances on a reception (RX) band. This may increase the complexity of transceiver filtering and to attenuate such disturbances may require very bulky and expensive form.

Transmitter signal may require heavy filtering (in some embodiments 40 dB-50 dB) at the reception frequency. Filters may be bulky and each band and system of the apparatus may need its own filter.

SUMMARY

Various embodiments provide a method and apparatus for coupling a transmitter signal to an antenna so that disturbances on a reception band may be reduced. In some embodiments a transmitter of the apparatus is coupled to a low impedance point of the antenna at the frequency range of the desired transmission signal and to a high impedance point of the antenna at the received frequency range. The interface provided by the low impedance feed point can be seen as a current-mode interface for the transmission signal and the interface provided by the high impedance feed point can be seen as a voltage-mode interface for the transmission signal. The low impedance feed point is provided with the transmission signal generated by the transmitter and the high impedance feed point is provided with an inverted portion of transmission signal. In some embodiments the amplitude of the inverted transmission signal may also be adjusted before coupling to the antenna. In some embodiments the impedance at the low impedance feed point is lower than 50 Ω, for example about 1 to 2 Ω, and the impedance at the high impedance feed point is higher than 50 Ω, for example about 5 kΩ.

Various aspects of examples of the invention are provided in the detailed description.

According to a first aspect, there is provided a method comprising:

providing a transmission signal to a first feed point of an antenna;

generating a modified signal from the transmission signal; and providing the modified signal to a second feed point of the antenna.

According to a second aspect, there is provided an apparatus comprising:

an antenna comprising a first feed point and a second feed point;

a first interface to provide a transmission signal to the first feed point;

a phase shifter for generating a modified signal from the transmission signal; and second interface to provide the modified signal to the second feed point.

According to a third aspect, there is provided an apparatus comprising:

means for providing a transmission signal to a first feed point of an antenna;

means for generating a modified signal from the transmission signal; and means for providing the modified signal to a second feed point of the antenna.

In some embodiments the impedance of the first feed point is lower than 50 Ω and the impedance at the second impedance feed point is higher than 50 Ω.

In some embodiments the first interface is at a low impedance portion of the antenna.

In some embodiments the second interface is at a high impedance portion of the antenna.

In some embodiments the antenna is a loop antenna.

In some embodiments the antenna is a patch antenna.

In some embodiments the antenna is a strip antenna.

In some embodiments the antenna comprises a radiator and a ground level.

Disturbances at the received signal due to transmission signal may reduce the quality of the received signals and reduce the sensitivity of the receiver. Therefore, reducing the disturbances may improve the overall efficiency of an apparatus comprising a transmitter and a receiver. In other words, high radio frequency (RF) isolation requirement between the transmitter and the receiver may be relaxed due to improved communication properties of the apparatus.

BRIEF DESCRIPTION OF THE DRAWINGS

For a more complete understanding of example embodiments of the present invention, reference is now made to the following descriptions taken in connection with the accompanying drawings in which:

FIG. 6 shows another example of an antenna with at least two feed points;

FIG. 7 shows yet another example of an antenna with at least two feed points.

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 2:
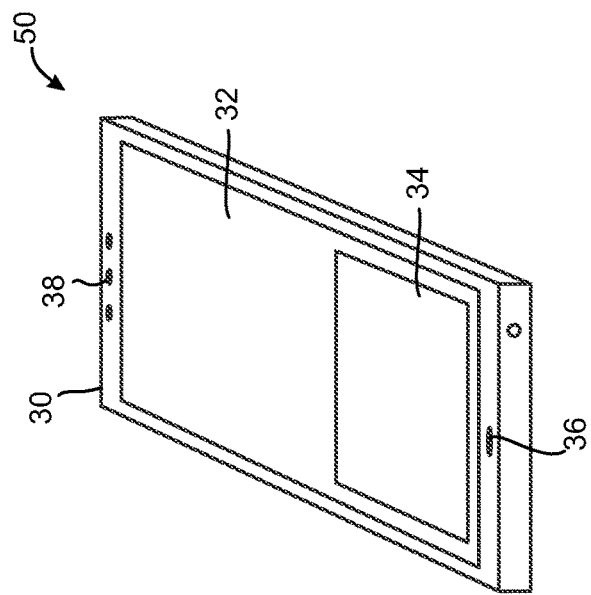
FIG. 2 shows an apparatus according to an example embodiment.
Figure 1:
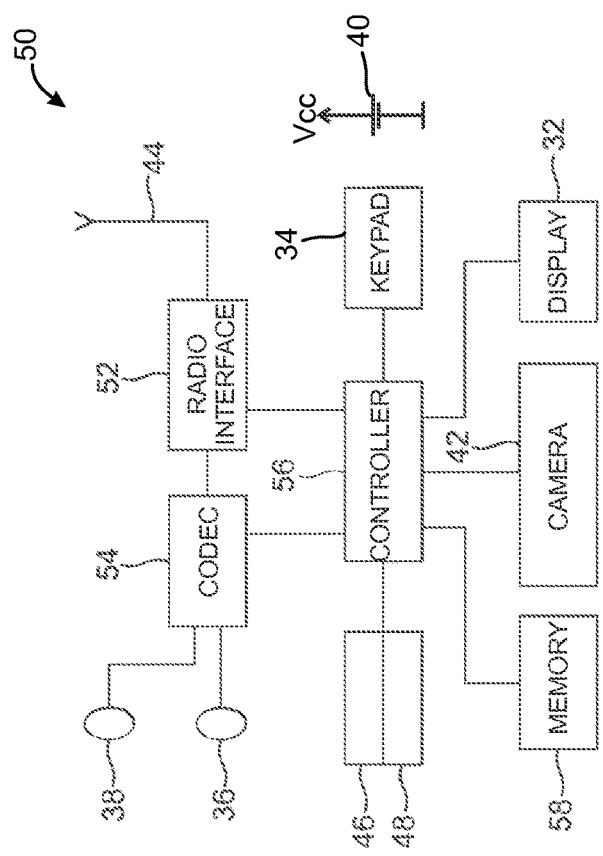
FIG. 1 shows a block diagram of an apparatus according to an example embodiment.

The following describes in further detail suitable apparatus and possible mechanisms for implementing the embodiments of the invention. In this regard reference is first made to FIG. 1 which shows a schematic block diagram of an exemplary apparatus or electronic device 50 depicted in FIG. 2, which may incorporate a receiver front end according to an embodiment of the invention.

The electronic device 50 may for example be a mobile terminal or user equipment of a wireless communication system. However, it would be appreciated that embodiments of the invention may be implemented within any electronic device or apparatus which may require reception of radio frequency signals.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 102 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting imaging.

Figure 3:
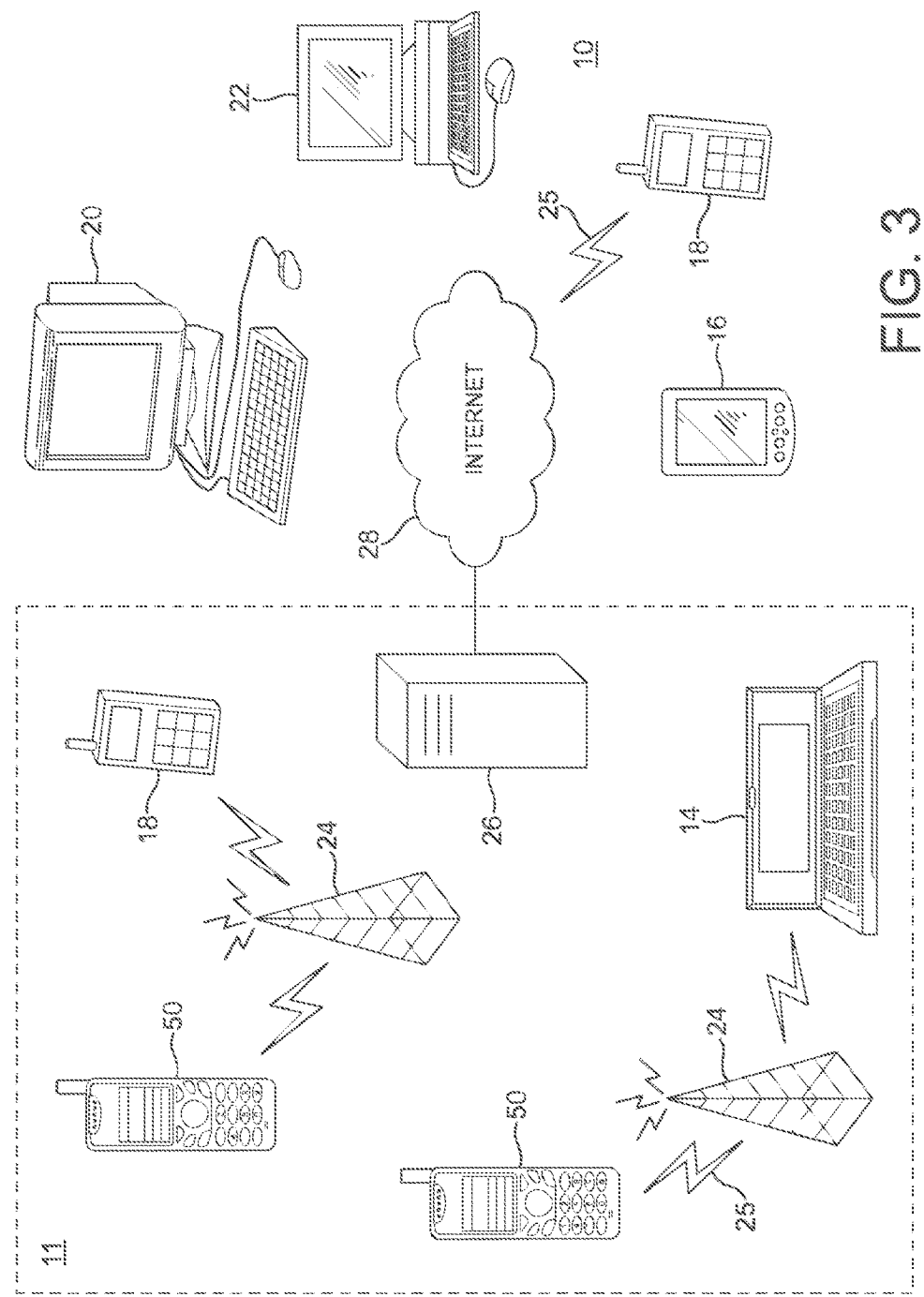
FIG. 3 shows an example of an arrangement for wireless communication comprising a plurality of apparatuses, networks and network elements.

With respect to FIG. 3, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection. In the following some example implementations of apparatuses utilizing the present invention will be described in more detail.

Figures 4A, 4B:
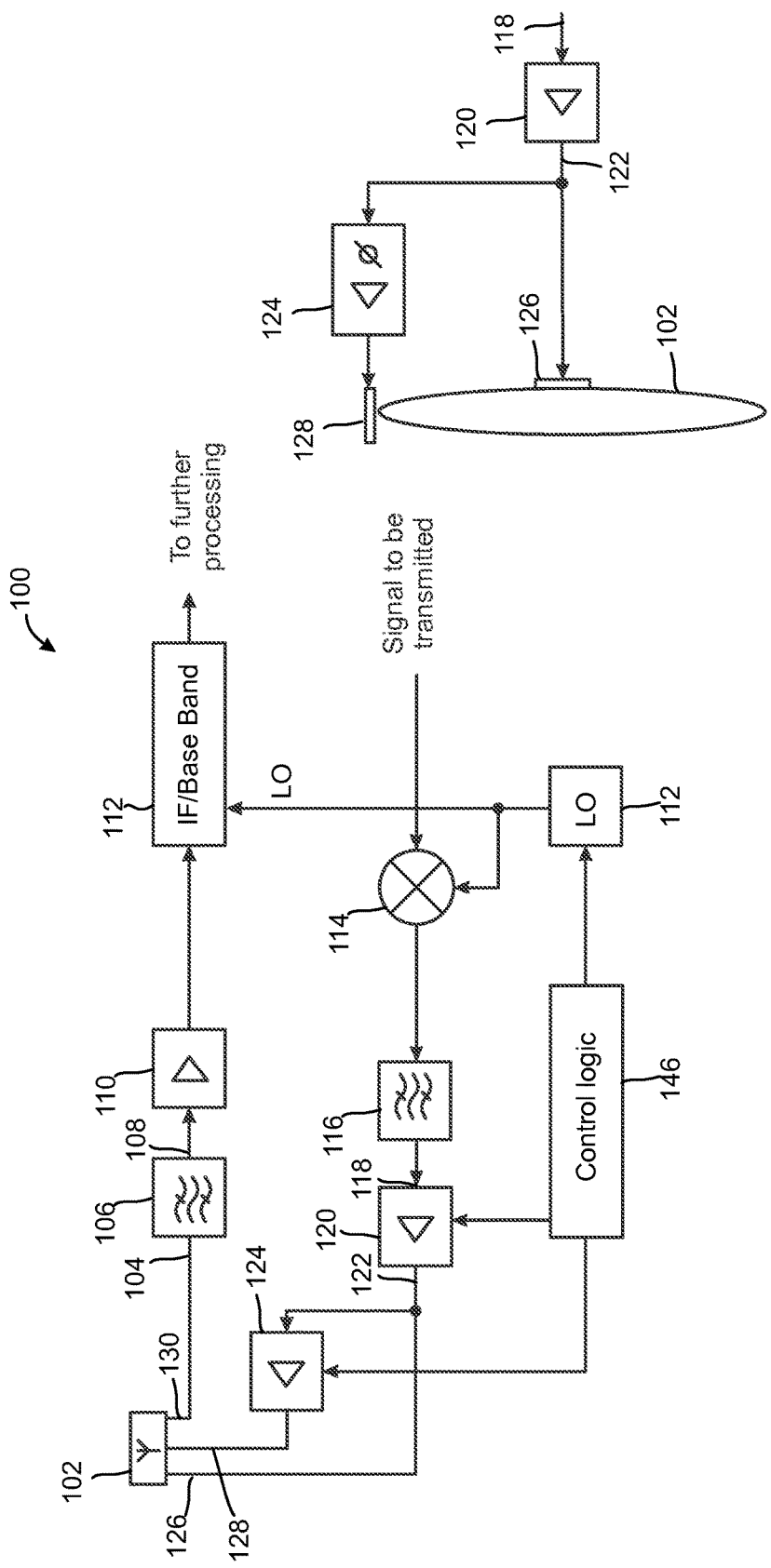
FIG. 4a shows a simplified block diagram of an apparatus according to an example embodiment.
FIG. 4b shows a principle of coupling a transmitter to an antenna.

FIG. 4a shows a block diagram of radio frequency (RF) elements of an apparatus 100 according to an example embodiment. In this non-limiting example embodiment the apparatus 100 comprises a transmitter and a receiver. This kind of apparatus may also be called as a transceiver.

The receiver converts a received radio signal first to the intermediate frequency and then to a baseband. In some other embodiments the intermediate frequency part is not needed wherein such receivers, which may also be called as direct-conversion receivers, convert a received radio signal directly to the baseband.

In the example embodiment of FIG. 4a, the apparatus comprises an antenna 102 for receiving and transmitting radio frequency (RF) signals. In some embodiments there may be separate antennas for the receiver and the transmitter.

The apparatus may be able to transmit and receive at the same time. For example, the apparatus may be operating by duplexing between the TX and RX frequencies in an FDD (Frequency Division Duplex) mode.

In this example embodiment the antenna 102 is connected to an input 104 of a first bandpass filter 106 for filtering received RF signals to eliminate or attenuate signals which are outside the desired frequency range of the RF signals. The filtered signals may be output 108 to a first amplifier 110 for amplifying the signals. The first amplifier 110 may be a low-noise amplifier (LNA) or another kind of amplifier suitable for amplifying RF signals. The amplified RF signals may be converted to intermediate signals (IF) or directly to base band signals by mixing the RF signals with one or more local oscillator signals LO from the same local oscillator 112 or from another local oscillator. The structure of the IF/base band elements 110 of the receiver are not depicted in more detail in this context.

In some embodiments the apparatus 100 may be designed to operate in more than one communication system wherein the frequency bands used by the communication systems may vary. For example, the frequency bands which the apparatus 100 should be able to utilize may be located near 900 MHz, near 1800 MHz, and near 2500 MHz, or even at higher frequencies, e.g. up to about 5 GHz.

In some embodiments the received signals may be converted to digital representations by an analogue-to-digital conversion before converting the signals to base band signals. For example, the analogue-to-digital conversion may be performed in the front end wherein the filtered analogue radio frequency signals may be converted to digital representations (e.g. samples), wherein the other stages of the receiver may operate using the digital representations of the received signals.

Figure 8:
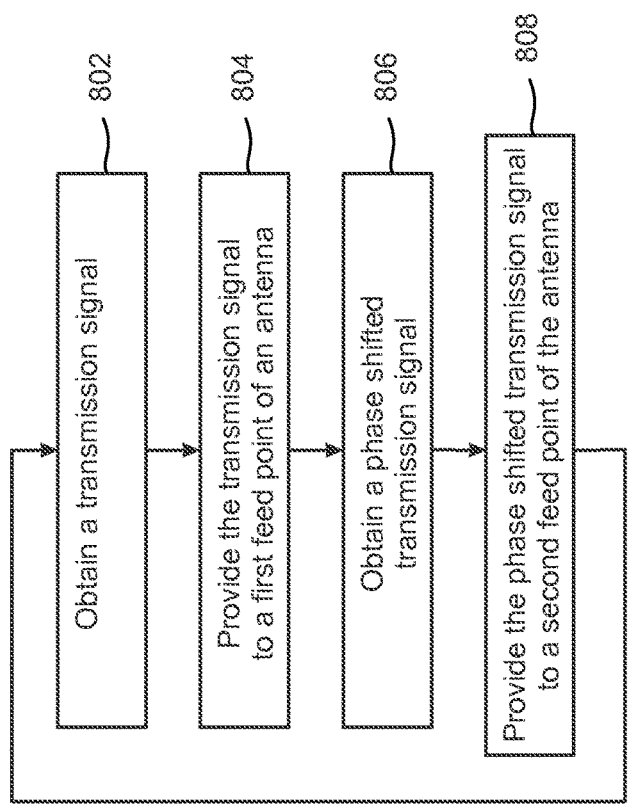
FIG. 8 depicts a method according to an embodiment.

FIG. 4a also depicts a part of a transmitter of the apparatus and FIG. 8 depicts a method according to an embodiment. A signal to be transmitted is input to the mixer 114 of the transmitter in which the signal is mixed with the local oscillator signal from the local oscillator 112. The mixing result is band bass filtered by a second band bass filter 116 so that the signals at the correct transmitting frequency (block 802 in FIG. 8) may be connected to an amplifier 120 to be amplified and coupled (block 804) to a first feed point 126 of the antenna 102. The transmitter also comprises a phase shifter 124 to modify the transmission signal (block 806) for coupling (block 808) the modified signal to a second feed point 128 of the antenna 102.

The operation of the transmitter, the receiver, amplifiers 110, 120, the phase shifter 136, filters 106, 116 and/or other circuitry may be performed e.g. by the control logic 146. The control logic 146 may, for example, adjust a capacitance value of an adjustable capacitor to obtain a correct resonance for the feed point 126, 128.

FIG. 4b shows the principle of the usage of multiple feed points in the RF interference reduction according to some embodiments. The input 118 of the amplifier 120 is provided with the signal to be transmitted for amplification and/or for impedance matching. The amplified transmission signal at the output 122 of the amplifier 120 is coupled to the first feed point 126 of the antenna 102 and to the phase shifter 124. The phase shifter 124 shifts the phase of the transmission signal. In some embodiments the phase shift is about 180 degrees i.e. the phase shifter 124 operates as an inverter. The phase shifter 124 may also be able to amplify and/or attenuate the transmission signal so that the amplitude of the phase shifted signal may be adjusted to improve the RF interference attenuation when needed. The modified signal is coupled to the antenna at the second feed point 128. The modified signal may be phase shifted and/or amplitude adjusted signal. The phase shifted signal may be used for noise cancelling purposes.

Figure 5A:
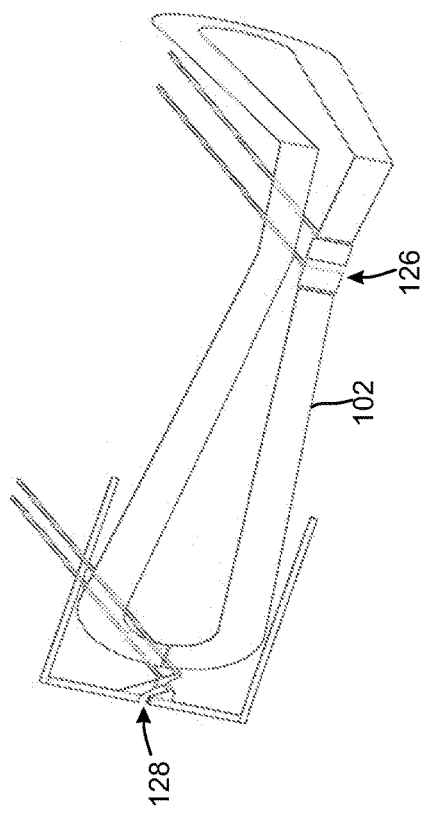
FIG. 5a shows an example of the coupling of a transmitter to an antenna.

In FIG. 5a an example embodiment of the antenna 102 is depicted. The antenna 102 is formed to a loop comprising one or more turns and may also be formed as a strip of conducting metal such as a copper strip in a loop form. The first feed point 126 may be formed as a differential feed point wherein the transmission signal is fed to the feed point as a differential signal. In this embodiment the coupling of the transmission signal is capacitive, series impedance coupling. The resonance of the first feed point 126 may be adjusted by using e.g. a tunable capacitance (not shown) in parallel or in series with the first feed point 126. The second feed point 128 may also be formed as a differential feed point wherein the phase shifted transmission signal is fed to the feed point as a differential signal. In this embodiment the coupling of the transmission signal is capacitive, parallel impedance coupling. The coupling is implemented with two stripes located near the high impedance location of the antenna. In this example the high impedance location is at the end of the loop, which can be seen from FIG. 5a. There may also be another high impedance location in the antenna 102 at the other end of the loop. The resonance of the second feed point 128 may also be adjusted by using e.g. a tunable capacitance (not shown) in parallel or in series with the second feed point 128.

In some embodiments it may not be necessary to adjust the impedances of the feed points when the transmitter and the receiver are operating within the same frequency band, but the adjustment of the impedances may be necessary when changing the operation of the transmitter and the receiver to another frequency band.

In some embodiments transmission signals may be frequency selective transmission signals.

When using the antenna structure similar to the antenna 102 of FIG. 5a it may be possible to use the other high impedance location as a feed point for the receiver, or the second feed point 128 may be used as the feed point for the receiver. That is because the different impedance levels for the feeding points may provide natural isolation between the feeds and enables FDD operation for the system without additional filtering. Further aspect of the connection would be a reception diversity antenna connection at the transmission antenna for the system in a case where separate antennas for transmission and reception are used.

In some embodiments the interface provided by the first (low impedance) feed point 126 operates as a current-mode interface for the transmission signal at the transmission frequency band and the interface provided by the second (high impedance) feed point 128 operates as a voltage-mode interface for the transmission signal at the receiver frequency band. Therefore, the transmission signal couples via the first feed point 126 effectively to the antenna substantially only at the desired TX frequency range, and the phase-inverted noise in the transmission signal couples via the second feed point 128 to the antenna substantially only at the RX frequency band. Therefore, the noise at the RX frequency band may be attenuated mainly by two mechanisms: First, the resonance-shaped impedance matching at the desired TX frequency range means that the noise at the RX frequency band does not couple to the antenna as effectively as the desired transmission signal. In some embodiments the attenuation for the noise at the receive frequency range may be in the order of 20 dB. Second, the noise in the transmission signal at the RX frequency band is summed at the antenna to the transmission signal in an opposite phase and thus unwanted signals may further be attenuated. In some embodiments the further attenuation may be in the order of 30 dB.

In some embodiments the impedance at the first feed point 126 is lower than 50 Ω, for example about 1 to 2 Ω, and the impedance at the second feed point 128 is higher than 50 Ω, for example hundreds or thousands ohms, e.g. about 5 kΩ.

Figure 5B:
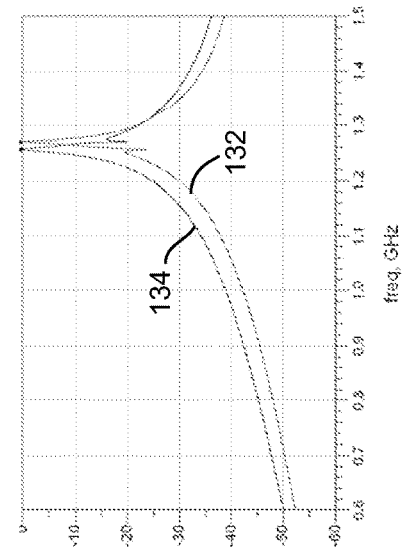
FIG. 5b illustrates in a simplified manner the behavior of S-parameters of the coupling of the antenna of FIG. 5a without using the second feed point.
Figure 5C:
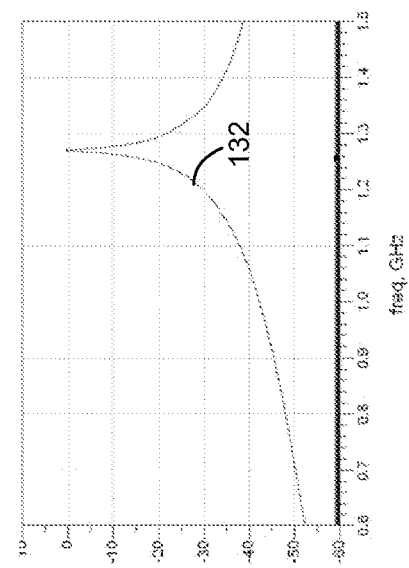
FIG. 5c illustrates in a simplified manner the behavior of S-parameters of the coupling of the antenna of FIG. 5a when using the second feed point.

In other words, some embodiments utilize two or more different impedance locations of the antenna. FIGS. 5b and 5c illustrate in a simplified manner the behavior of S-parameters of the coupling of the antenna 102 of FIG. 5a as a function of frequency. In FIG. 5b the second feed 128 point is not used and, respectively, in FIG. 5c the second feed point 128 is utilized. In FIG. 5c, the curve 132 depicts the simulation results of the S parameter between the antenna and the first feed point 126 and the curve 134 depicts the simulation results of the frequency response between the antenna and the second feed point 128. Both feed points 126, 128 are fed with the same frequency (signal). This way the ports are substantially isolated even if the frequency of the transmission signal is the same. The same applies even if the antenna 102 is a wideband antenna meaning that there is good efficiency over a wide frequency range. Areas applicable for high impedance feed point(s) and low impedance feed point(s) can be distincted from the antenna structure and the whole frequency range from the antenna can then be utilized by tuning the resonances. Then, a serial resonance with low impedance at the first feed point 126 and a parallel resonance with high impedance at the second feed point 128 can be provided for the coupling. The tuning of the resonance may be done e.g. with additional components in a way that both of the interfaces may be made separately tunable. The quality factor (Q) of the interface can be high because the connection is unloaded and due this the structure may provide high selectivity.

Embodiments of the present invention provide intrinsic isolation without transmission lines or bulky duplexers. The structures are tunable and suitable for variety of different bands and systems. Good isolation between ports may be achieved even if the ports are matched and used at the same frequency at the same antenna when one of the ports has high impedance and the other port has low impedance. The ports can be used independently from each other at many different frequencies.

When the same signal is fed to both feed points 126, 128 the feeding entities are not significantly disturbing each other since the load is different for different branches. That makes it possible to separately optimize the amplifier 120 feeding the first feed point 126 and the phase shifter 124 feeding the second feed point 128. Signals in a right phase cancel each out to provide RX noise cancellation at the TX transmitted signal.

In the following some additional example structures of the antenna 102 and the feed points 126, 128 are depicted in a simplified manner with reference to FIGS. 6 and 7. The antennas 102 of FIGS. 6 and 7 are so called patch antennas which comprise a radiator 102a and a ground plane 102b. The shape of both the radiator 102a and the ground plane 102b is, for example, rectangular. The first feed point 126 may be formed as a single-ended feed point wherein the transmission signal is fed to the feed point as a single-ended signal. The radiator 102a and the ground plane 102b are installed such that they are substantially parallel to each other and there is a distance between them. The distance, size and the aspect ratio of the rectangular plates may be selected to obtain desired operational parameters for the antenna 102, such as the frequency range in which the antenna 102 may provide good efficiency.

In these example antennas 102 the first feed point 126 is located substantially at the centre of the radiator 102a and the second feed point 128 is located in the middle of an edge of the radiator 102a. The exact location can be chosen to match the required performance of the interface and is not limited to this example.

The radiator 102a and the ground plane 102b may be formed by using a sheet of conducting metal such as copper, aluminium or other suitable material. In some embodiments the radiator 102a and the ground plane 102b may be formed on a printed circuit board e.g. in such a way that the radiator is formed on one side of the printed circuit board and the ground plane is formed using the opposite side of the printed circuit board or another layer inside the printed circuit board, if a multi-layer printed circuit board is used. The radiator and the ground plane may be formed by etching, printing and/or other techniques suitable for this purpose.

In the embodiments in which the same antenna 102 is used both for the transmitter and the receiver, the receiver may be coupled to the antenna 102 e.g. at the second feed point or at a separate feed point such as a third feed point 130 illustrated in FIG. 4a.

Although the above examples describe embodiments of the invention operating within a wireless communication device, it would be appreciated that the invention as described above may be implemented as a part of any apparatus comprising a circuitry in which radio frequency signals are transmitted and received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some examples will be provided.

According to a first example, there is provided a method comprising:

providing a transmission signal to a first feed point of an antenna;

generating a modified signal from the transmission signal; and providing the modified signal to a second feed point of the antenna.

In some embodiments the method comprises:

providing the transmission signal to a low impedance portion of the antenna by the first feed point.

In some embodiments the method comprises:

providing the modified signal to a high impedance portion of the antenna by the second feed point.

In some embodiments the method comprises:

providing an impedance lower than 50 Ω at the first feed point; and providing an impedance higher than 50 Ω at the second feed point.

In some embodiments the method comprises:

providing the first feed point at a low impedance portion of the antenna; and providing the second feed point at a high impedance portion of the antenna. In some embodiments the method comprises:

providing a third feed point at the antenna for receiving signals from the antenna.

In some embodiments the method comprises:

providing the modified signal by modifying at least a portion of at least one of phase and amplitude of the transmission signal.

In some embodiments the method comprises:

providing several feed points at the antenna for receiving or transmitting signals from the antenna.

In some embodiments the method comprises using a loop antenna as the antenna.

In some embodiments the method comprises using a patch antenna as the antenna.

In some embodiments the method comprises using a strip antenna as the antenna.

In some embodiments the method comprises using an antenna comprising a radiator and a ground level.

According to a second example there is provided an apparatus comprising:

an antenna comprising a first feed point and a second feed point;

a first interface to provide a transmission signal to the first feed point;

a modifier for generating a modified signal from the transmission signal; and a second interface to provide the modified signal to the second feed point.

In some embodiments the first feed point is at a low impedance portion of the antenna.

In some embodiments the second feed point is at a high impedance portion of the antenna.

In some embodiments of the apparatus the first feed point has a first impedance; and the second feed point has a second impedance higher than the first impedance.

In some embodiments of the apparatus the first impedance is lower than 50 Ω; and the second impedance is higher than 50 Ω.

In some embodiments of the apparatus the first feed point has a first impedance; and the second feed point has a second impedance lower than the first impedance.

In some embodiments of the apparatus the antenna comprises a third feed point adapted to be connected to a receiver for receiving signals from the antenna.

In some embodiments of the apparatus the modifier is adapted to modify at least a portion of at least one of phase and amplitude of the transmission signal.

In some embodiments of the apparatus the antenna comprises several feed points for receiving or transmitting signals from the antenna.

In some embodiments of the apparatus the antenna is one of the following:

a loop antenna;

a patch antenna;

a strip antenna.

In some embodiments the antenna comprises a radiator and a ground plane.

In some embodiments the apparatus is a part of a mobile communication device.

According to a third example, there is provided an apparatus comprising:

means for providing a transmission signal to a first feed point of an antenna;

means for generating a modified signal from the transmission signal; and means for providing the modified signal to a second feed point of the antenna.

In some embodiments the apparatus comprises:

means for providing the transmission signal at a low impedance portion of the antenna by the first feed point.

In some embodiments the apparatus comprises:

means for providing the modified signal at a high impedance portion of the antenna by the second feed point.

In some embodiments the apparatus comprises:

means for providing an impedance lower than 50 Ω at the first feed point; and means for providing an impedance higher than 50 Ω at the second feed point.

In some embodiments the apparatus comprises:
means for providing the first feed point at a low impedance portion of the antenna; and
means for providing the second feed point at a high impedance portion of the antenna.

In some embodiments the apparatus comprises:
means for adjusting the amplitude of the modified signal before providing the modified signal to the second feed point.

In some embodiments the apparatus comprises:
means for providing a third feed point at the antenna for receiving signals from the antenna.

In some embodiments of the apparatus the means for providing the modified signal comprises means for modifying at least a portion of at least one of phase and amplitude of the transmission signal.

In some embodiments the apparatus comprises means for providing several feed points at the antenna for receiving or transmitting signals from the antenna.

In some embodiments the apparatus comprises a loop antenna.

In some embodiments the apparatus comprises a patch antenna.

In some embodiments the apparatus comprises a strip antenna.

In some embodiments of the apparatus the antenna comprises a radiator and a ground level.

The invention claimed is:

1. A method comprising:
providing a transmission signal at a current mode interface to a first feed point of an antenna, wherein the antenna provides a first impedance at the first feed point, and wherein the transmission signal is coupled to the first feed point at a desired transmission frequency range;
generating a modified signal from the transmission signal; and
providing the modified signal at a voltage mode interface to a second feed point of the antenna, wherein the antenna provides a second impedance at the second feed point, wherein the modified signal is coupled to the second feed point to attenuate noise in the transmission signal at a receiver frequency band, and wherein the second impedance is greater than the first impedance.

2. The method according to claim 1, wherein the transmission signal is coupled to the first feed point through series impedance coupling, and wherein the modified signal is coupled to the second feed point through parallel impedance coupling.

3. The method according to claim 1, wherein the first impedance is lower than 50Ω, at the first feed point, and wherein the second impedance is higher than 50Ω at the second feed point.

4. The method according to claim 1, further comprising:
adjusting the amplitude of the modified signal before providing the modified signal to the second feed point.

5. The method according to claim 1, further comprising:
providing a third feed point at the antenna for receiving signals from the antenna, wherein the antenna provides a third impedance at the third feed point, and wherein the third impedance is greater than the first impedance.

6. The method according to claim 1 further comprising:
providing the modified signal by modifying at least a portion of at least one of phase and amplitude of the transmission signal.

7. The method according to claim 1, wherein the antenna comprises at least one of a loop antenna, a patch antenna, and a strip antenna.

8. The method according to claim 1, wherein the antenna comprises a radiator and a ground plane, wherein the first feed point is located substantially at the center of the radiator, and wherein the second feed point is located substantially in a middle of an edge of the ground plane.

9. An apparatus comprising:
an antenna comprising a first feed point and a second feed point, wherein the antenna provides a first impedance at the first feed point, wherein the antenna provides a second impedance at the second feed point, and wherein the second impedance is greater than the first impedance;
a current mode interface to provide a transmission signal to the first feed point, wherein the transmission signal is coupled to the first feed point at a desired transmission frequency range;
a modifier for generating a modified signal from the transmission signal; and
a voltage mode interface to provide the modified signal to the second feed point, wherein the modified signal is coupled to the second feed point to attenuate noise in the transmission signal at a receiver frequency band.

10. The apparatus according to claim 9, wherein:
the current mode interface provides series impedance coupling between the transmission signal and the first feed point; and
the voltage mode interface provides parallel impedance coupling between the transmission signal and the second feed point.

11. The apparatus according to claim 9, wherein:
the first feed point comprises a first differential feed point; and
the second feed point comprises a second differential feed point having different inputs from the first differential feed point.

12. The apparatus according to claim 9, wherein:
the first impedance is lower than 50Ω; and
the second impedance is higher than 50Ω.

13. The apparatus according to claim 9, wherein:
the first feed point is coupled to the transmission signal substantially at a desired transmission frequency range; and
the second feed point is coupled to the modified signal substantially at a desired reception frequency range.

14. The apparatus according to the claim 9, further comprising:
an amplifier for adjusting the amplitude of the modified signal before providing the modified signal to the second feed point.

15. The apparatus according to claim 9, wherein the antenna comprises a third feed point adapted to be connected to a receiver for receiving signals from the antenna, wherein the antenna provides a third impedance at the third feed point, and wherein the third impedance is greater than the first impedance.

16. The apparatus according to claim 9, wherein the modifier is adapted to modify at least a portion of at least one of phase and amplitude of the transmission signal.

17. The apparatus according to claim 9, wherein the antenna comprises at least one of a loop antenna, a patch antenna, and a strip antenna.

18. The apparatus according to claim 9, wherein the antenna comprises a radiator and a ground plane wherein the first feed point is located substantially at the center of the radiator, and wherein the second feed point is located substantially in a middle of an edge of the ground plane.

\* \* \* \* \*